United States Patent
Atkinson

(10) Patent No.: US 12,368,816 B1
(45) Date of Patent: Jul. 22, 2025

(54) CEILING-MOUNTED REPLICA JUMBOTRON

(71) Applicant: Clinton Colt Atkinson, Waxhaw, NC (US)

(72) Inventor: Clinton Colt Atkinson, Waxhaw, NC (US)

( * ) Notice: Subject to any disclaimer, the term of this patent is extended or adjusted under 35 U.S.C. 154(b) by 157 days.

(21) Appl. No.: 18/239,229

(22) Filed: Aug. 29, 2023

(51) Int. Cl.
  *H04N 5/655* (2006.01)
  *F16M 13/02* (2006.01)

(52) U.S. Cl.
  CPC .......... *H04N 5/655* (2013.01); *F16M 13/027* (2013.01)

(58) Field of Classification Search
  CPC .............................. H04N 5/655; F16M 13/027
  See application file for complete search history.

(56) References Cited

U.S. PATENT DOCUMENTS

| | | | | |
|---|---|---|---|---|
| 6,056,406 A * | 5/2000 | Park | ...................... | G03B 37/00 353/74 |
| 6,168,285 B1 * | 1/2001 | Flohre | ................... | F04D 25/088 362/365 |
| 6,367,934 B1 * | 4/2002 | Salesky | ................... | G09F 19/18 353/74 |
| 6,851,211 B2 * | 2/2005 | Sender | ...................... | G09F 7/22 40/431 |
| 6,921,336 B1 * | 7/2005 | Best | ...................... | A63F 13/843 463/40 |
| 7,407,294 B2 * | 8/2008 | Choi | .................... | H04N 9/3147 353/77 |
| 7,526,362 B2 * | 4/2009 | Kim | ...................... | G05D 1/0033 701/28 |
| 7,712,125 B2 * | 5/2010 | Herigstad | .......... | H04N 21/4755 725/38 |
| 7,931,535 B2 * | 4/2011 | Ikeda | .................... | A63F 13/211 463/31 |
| 7,942,745 B2 * | 5/2011 | Ikeda | .................... | A63F 13/213 463/31 |
| 7,954,976 B1 * | 6/2011 | Berge | ...................... | F21V 21/00 362/148 |

(Continued)

FOREIGN PATENT DOCUMENTS

CA  2550314  12/2006

OTHER PUBLICATIONS

Monoprice Commercial Series Quad Sided Ceiling TV Mount Bracket. Monoprice. Retrieved Sep. 20, 2020, from https://www.monoprice.com/product?p_id=34196. (Year: 2020).*

(Continued)

*Primary Examiner* — Michael B. Pierorazio
(74) *Attorney, Agent, or Firm* — Kyle A. Fletcher, Esq.

(57) ABSTRACT

The ceiling-mounted replica jumbotron comprises a frame and a bottom cover panel. The frame may be operable to suspend a plurality of flat screen televisions from a ceiling of a room such that each of the plurality of flat screen televisions is oriented at an oblique angle with respect to vertical and the plurality of flat screen televisions face different directions. The frame may be coupled to the ceiling of the room such that the ceiling-mounted replica jumbotron may cover a ceiling electrical box. In some embodiments, the ceiling-mounted replica jumbotron may include a plurality of accent panels, an infinity mirror, accent lighting, or any combination thereof to establish an atmosphere for viewers.

18 Claims, 4 Drawing Sheets

(56) References Cited

U.S. PATENT DOCUMENTS

| | | | | |
|---|---|---|---|---|
| 7,974,535 | B2 * | 7/2011 | Nakamura | G08C 23/04 |
| | | | | 398/107 |
| 8,472,174 | B2 * | 6/2013 | Idems | H05K 7/20972 |
| | | | | 361/679.21 |
| 8,531,050 | B2 * | 9/2013 | Barney | A63F 13/90 |
| | | | | 345/158 |
| 8,698,746 | B1 * | 4/2014 | Merrick | G06F 3/038 |
| | | | | 345/157 |
| 8,740,708 | B2 * | 6/2014 | Karacal | A63F 13/245 |
| | | | | 463/47 |
| 8,753,205 | B2 * | 6/2014 | Kando | G06F 3/04815 |
| | | | | 463/31 |
| 8,830,067 | B2 * | 9/2014 | Igaki | G08C 17/02 |
| | | | | 340/693.11 |
| 8,830,170 | B2 * | 9/2014 | Kao | G06F 3/0325 |
| | | | | 345/169 |
| 9,011,248 | B2 * | 4/2015 | Ikeda | A63F 13/533 |
| | | | | 463/38 |
| 9,062,817 | B1 * | 6/2015 | Housman | F16M 13/027 |
| D786,244 | S * | 5/2017 | Mohideen | D14/371 |
| 10,182,279 | B1 * | 1/2019 | Zhou | F21S 6/005 |
| 10,665,997 | B1 * | 5/2020 | Lee | H01R 33/9453 |
| 11,727,832 | B2 * | 8/2023 | Bailey | G09F 19/14 |
| | | | | 345/1.1 |
| 2002/0162120 | A1 * | 10/2002 | Mitchell | H04N 21/8586 |
| | | | | 725/135 |
| 2003/0216177 | A1 * | 11/2003 | Aonuma | A63F 13/525 |
| | | | | 463/32 |
| 2005/0210502 | A1 * | 9/2005 | Flickinger | H04N 21/2668 |
| | | | | 725/35 |
| 2005/0230590 | A1 * | 10/2005 | Westbrook | F16M 11/425 |
| | | | | 248/327 |
| 2006/0274536 | A1 * | 12/2006 | Hagen, Sr. | F21V 23/02 |
| | | | | 362/147 |
| 2007/0008716 | A1 * | 1/2007 | Glickman | F21S 8/02 |
| | | | | 362/147 |
| 2007/0022437 | A1 * | 1/2007 | Gerken | H04N 21/4348 |
| | | | | 348/E7.071 |
| 2007/0052177 | A1 * | 3/2007 | Ikeda | A63F 13/24 |
| | | | | 273/317 |
| 2007/0060391 | A1 * | 3/2007 | Ikeda | A63F 13/285 |
| | | | | 463/46 |
| 2007/0124775 | A1 * | 5/2007 | DaCosta | H04N 21/6582 |
| | | | | 348/E7.071 |
| 2007/0127234 | A1 * | 6/2007 | Jervey, III | F21V 21/02 |
| | | | | 362/147 |
| 2008/0082510 | A1 * | 4/2008 | Wang | G06F 16/683 |
| 2008/0153593 | A1 * | 6/2008 | Ikeda | A63F 13/98 |
| | | | | 463/37 |
| 2008/0178241 | A1 * | 7/2008 | Gilboy | H04N 21/6587 |
| | | | | 348/E7.071 |
| 2009/0067847 | A1 * | 3/2009 | Nakamura | G08C 23/04 |
| | | | | 398/128 |
| 2009/0163274 | A1 * | 6/2009 | Kando | A63F 13/577 |
| | | | | 463/31 |
| 2009/0249388 | A1 * | 10/2009 | Seidel | H04N 21/812 |
| | | | | 725/32 |
| 2009/0312884 | A1 * | 12/2009 | Li | G09F 9/33 |
| | | | | 700/295 |
| 2010/0192173 | A1 * | 7/2010 | Mizuki | H04N 21/4312 |
| | | | | 725/115 |
| 2010/0199318 | A1 * | 8/2010 | Chang | H04N 21/47202 |
| | | | | 725/97 |
| 2011/0058326 | A1 * | 3/2011 | Idems | G09F 9/30 |
| | | | | 361/679.21 |
| 2011/0172016 | A1 * | 7/2011 | Ikeda | A63F 13/23 |
| | | | | 463/37 |
| 2011/0190052 | A1 * | 8/2011 | Takeda | A63F 13/213 |
| | | | | 463/31 |
| 2011/0247042 | A1 * | 10/2011 | Mallinson | H04N 21/2225 |
| | | | | 725/86 |
| 2012/0046767 | A1 * | 2/2012 | Shimohata | A63F 13/65 |
| | | | | 700/91 |
| 2012/0133582 | A1 * | 5/2012 | Ohsawa | G06F 3/0325 |
| | | | | 345/157 |
| 2012/0192222 | A1 * | 7/2012 | Kumar | H04N 21/812 |
| | | | | 725/32 |
| 2012/0192228 | A1 * | 7/2012 | Zito | G06F 16/9535 |
| | | | | 725/34 |
| 2014/0036517 | A1 * | 2/2014 | Machiorlette | F21S 8/061 |
| | | | | 362/387 |
| 2014/0179157 | A1 * | 6/2014 | Gonzalez | H02G 3/14 |
| | | | | 439/535 |
| 2021/0248936 | A1 * | 8/2021 | Bailey | G09F 9/35 |
| 2021/0295760 | A1 * | 9/2021 | Lee | G06F 3/1446 |

OTHER PUBLICATIONS

Monoprice Specialty Ceiling Mounted TV Wall Mount Bracket Quad Sided. Monoprice. Retrieved Apr. 3, 2025, from https://www.monoprice.com/product?p_id=34196. (Year: 2025).*

Monoprice. (Jul. 10, 2020). Quad Sided Ceiling TV Mount Bracket Installation Guide. https://downloads.monoprice.com/files/manuals/34196_Manual_200710.pdf. (Year: 2020).*

* cited by examiner

CEILING-MOUNTED REPLICA JUMBOTRON

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of video displays and home theater systems, more specifically, a ceiling-mounted replica jumbotron.

SUMMARY OF INVENTION

The ceiling-mounted replica jumbotron comprises a frame and a bottom cover panel. The frame may be operable to suspend a plurality of flat screen televisions from a ceiling of a room such that each of the plurality of flat screen televisions is oriented at an oblique angle with respect to vertical and the plurality of flat screen televisions face different directions. The frame may be coupled to the ceiling of the room such that the ceiling-mounted replica jumbotron may cover a ceiling electrical box. In some embodiments, the ceiling-mounted replica jumbotron may comprise a plurality of accent panels, an infinity mirror, accent lighting, or any combination thereof to establish an atmosphere for viewers.

An object of the invention is to provide a frame that may couple to the ceiling of a room and a bottom panel that is hingedly coupled to the bottom of the frame.

Another object of the invention is to provide a plurality of television mounting sites on the frame such that a plurality of flat screen televisions may be detachably coupled to the fames.

A further object of the invention is to provide a plurality of accent panels that may cover the corners of the invention between individual flat screen televisions.

Yet another object of the invention is to provide an infinity mirror, accent lighting, illuminated logos, or any combination thereof.

These together with additional objects, features and advantages of the ceiling-mounted replica jumbotron will be readily apparent to those of ordinary skill in the art upon reading the following detailed description of the presently preferred, but nonetheless illustrative, embodiments when taken in conjunction with the accompanying drawings.

In this respect, before explaining the current embodiments of the ceiling-mounted replica jumbotron in detail, it is to be understood that the ceiling-mounted replica jumbotron is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ceiling-mounted replica jumbotron.

It is therefore important that the claims be regarded as including such equivalent construction insofar as they do not depart from the spirit and scope of the ceiling-mounted replica jumbotron. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
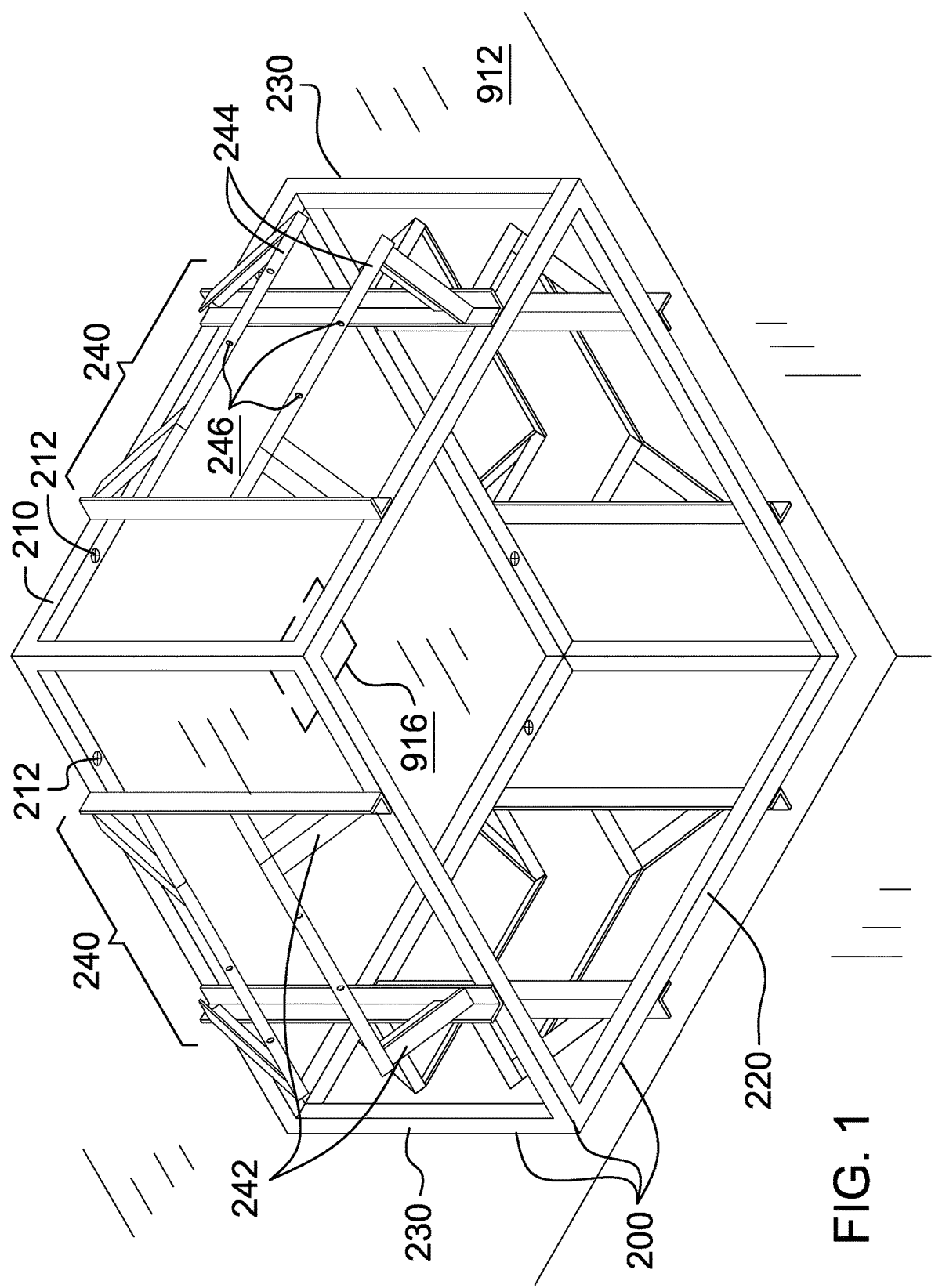
FIG. 1 is a bottom isometric view of an embodiment of the disclosure.
Figure 2:
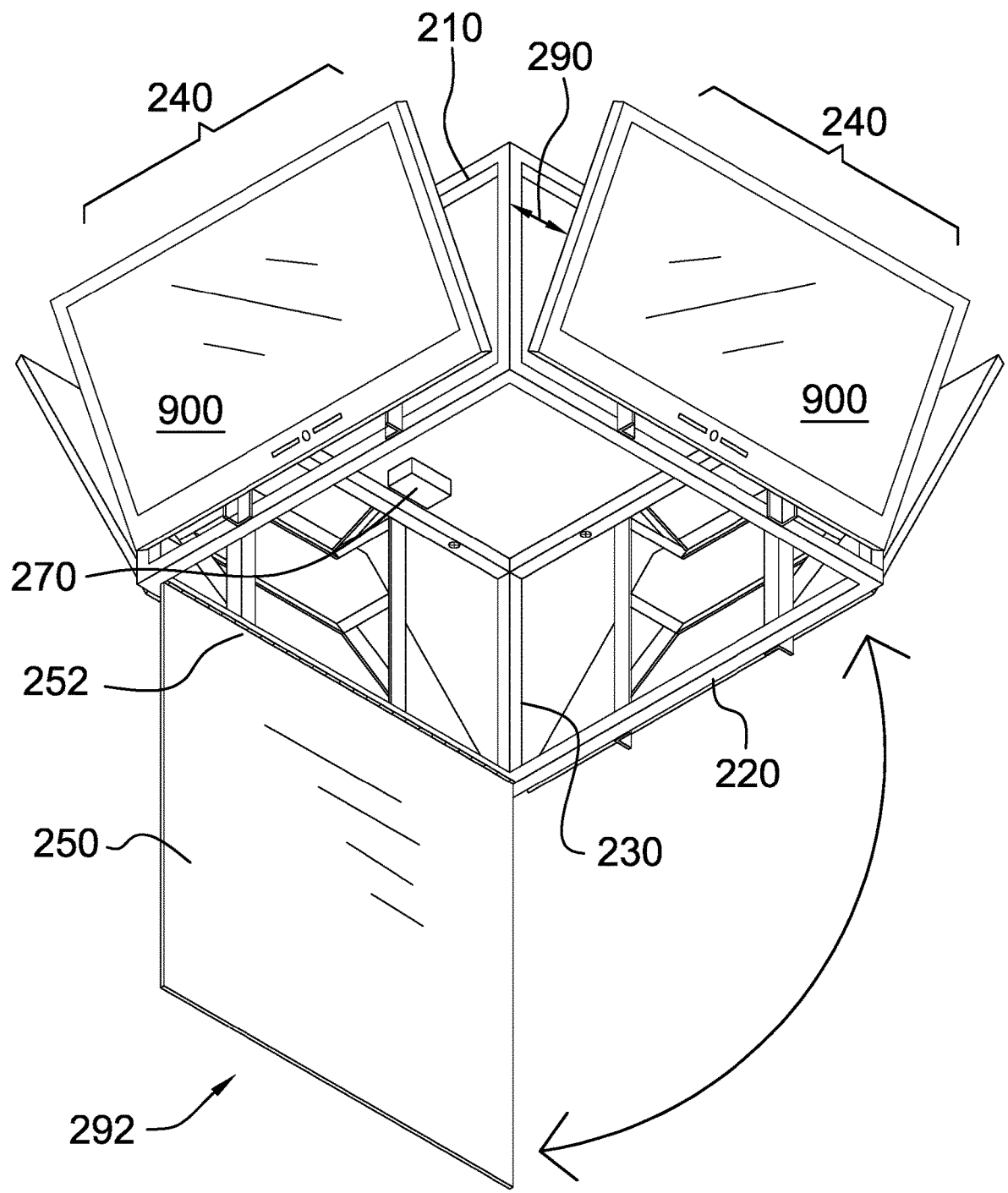
FIG. 2 is a detail view of an embodiment of the disclosure, illustrating the bottom panel in the bottom panel open position.
Figure 3:
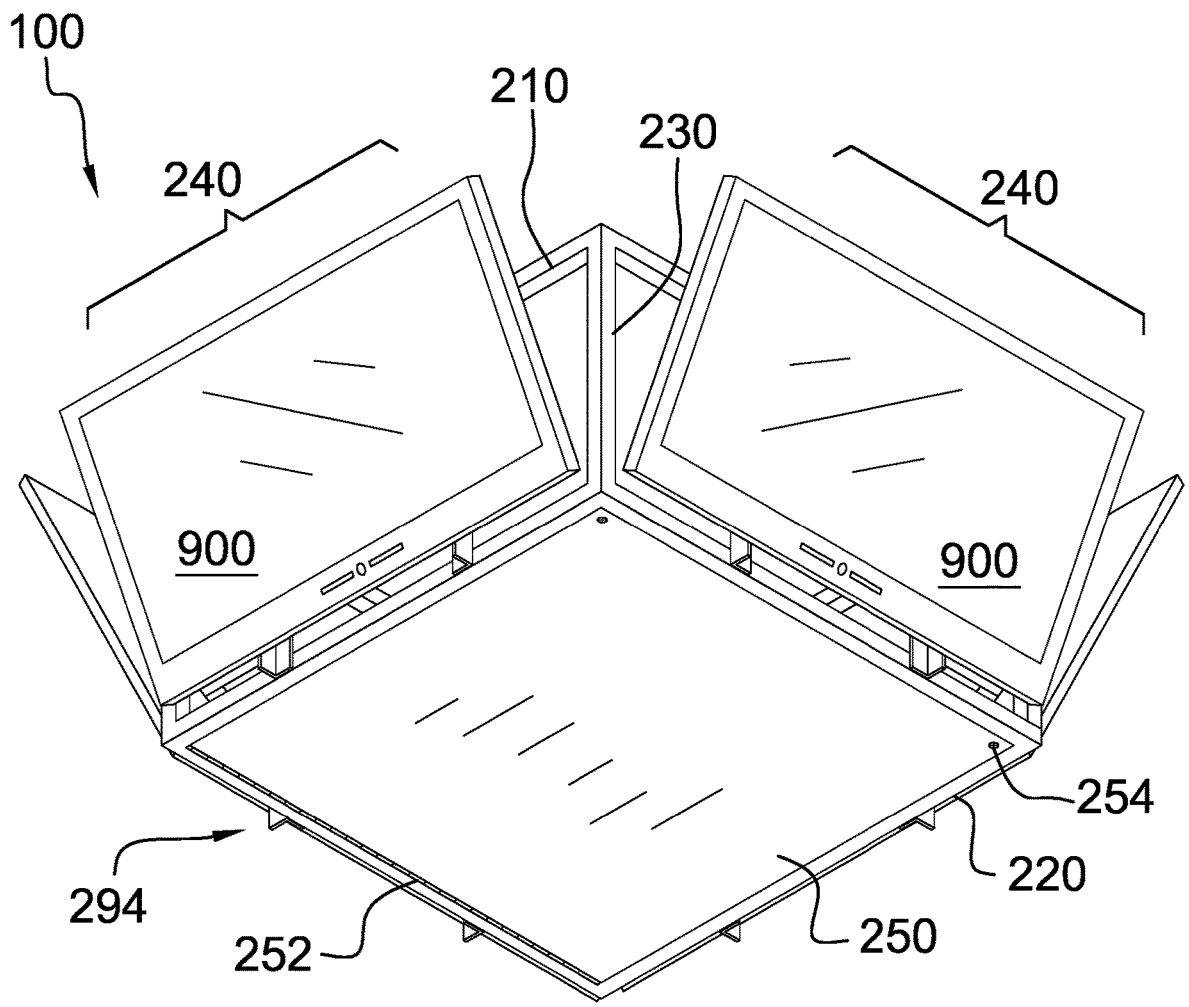
FIG. 3 is a detail view of an embodiment of the disclosure, illustrating the bottom panel in the bottom panel closed position.
Figure 4:
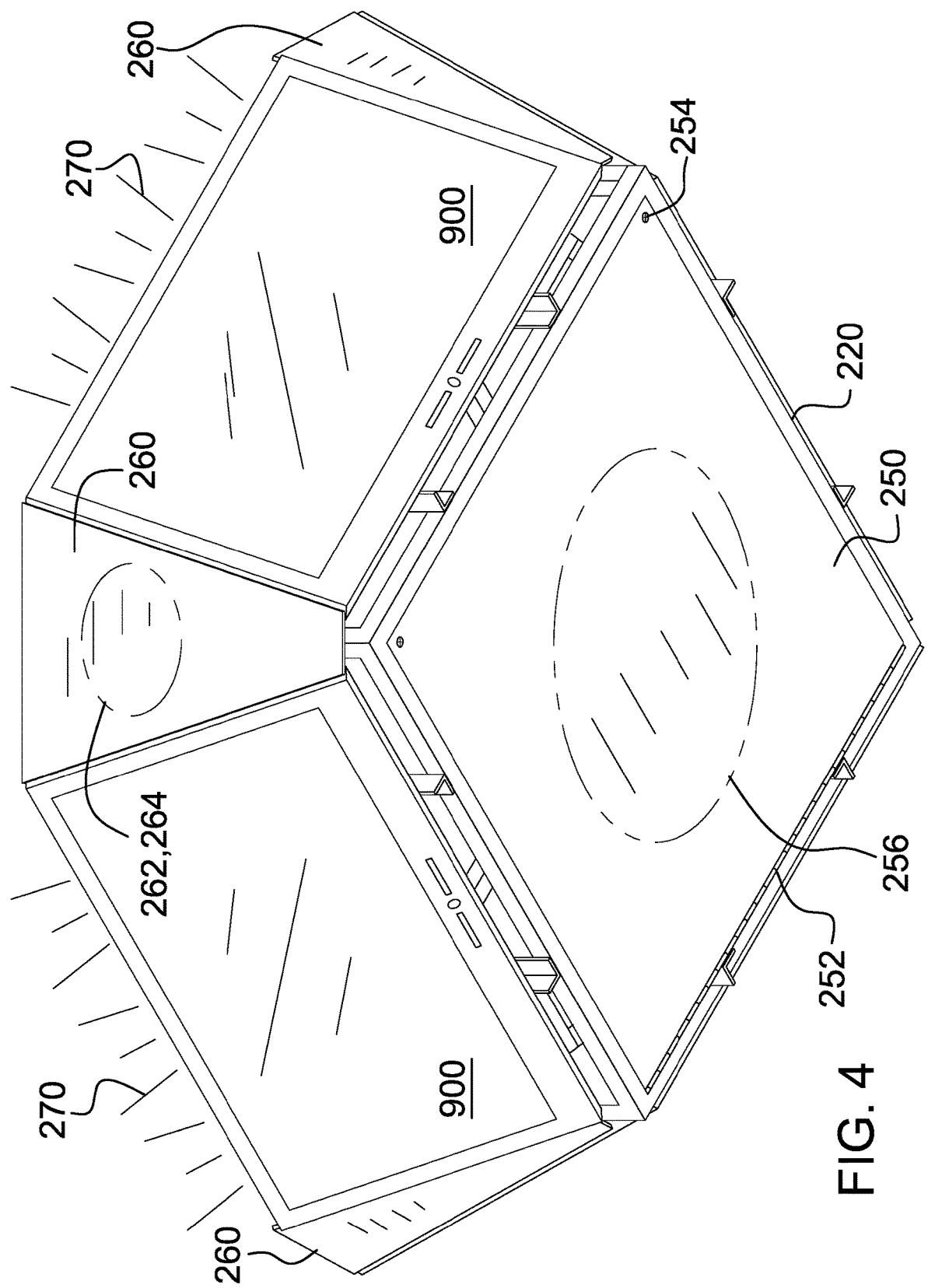
FIG. 4 is an in-use view of an embodiment of the disclosure.

Detailed reference will now be made to a first potential embodiment of the disclosure, which is illustrated in FIGS. 1 through 4.

The ceiling-mounted replica jumbotron 100 (hereinafter invention) comprises a frame 200 and a bottom cover panel 250. The frame 200 may be operable to suspend a plurality of flat screen televisions 900 from a ceiling 912 of a room such that each of the plurality of flat screen televisions 900 is oriented at an oblique angle 290 with respect to vertical and the plurality of flat screen televisions 900 face different directions. The frame 200 may be coupled to the ceiling 912 of the room such that the invention 100 may cover a ceiling electrical box 916. In some embodiments, the invention 100 may comprise a plurality of accent panels 260, an infinity mirror 256, accent lighting 270, or any combination thereof to establish an atmosphere for viewers.

The frame 200 may comprise a top plate 210, a bottom plate 220, a plurality of corner studs 230, and a plurality of television mounting sites 240. The frame 200 may be coupled to the ceiling 912 and the plurality of flat screen televisions 900 may detachably couple to the frame 200 at the plurality of television mounting sites 240. The frame 200 may have a square footprint and may support four flat screen televisions of equal size. In a preferred embodiment, the frame 200 may be made of metal studs.

The top plate 210 may be a horizontally-oriented square arrangement of armatures. The top plate 210 may comprise a plurality of mounting apertures 212 such that the top plate 210 may be coupled to ceiling joists using mounting hardware. The bottom plate 220 may be a horizontally-oriented square arrangement of armatures. The bottom plate 220 may be the same size as the top plate 210. The bottom plate 220 may be suspended directly beneath the top plate 210 by the plurality of corner studs 230. There may be four corner studs coupling the four corners of the top plate 210 to the four corners of the bottom plate 220. In some embodiments, the bottom plate 220 may comprise trim pieces that cover the ends of armatures used to construct the frame 200.

The plurality of flat screen televisions 900 may couple to the plurality of television mounting sites 240. The plurality of television mounting sites 240 may surround the frame 200. An individual television mounting site selected from the plurality of television mounting sites 240 may be located on each side of the invention 100 and may project away from the center of the frame 200. In a preferred embodiment, there may be a four television mounting sites.

The individual television mounting site may comprise at least two angled armatures 242 to define the oblique angle 290 for an individual flat screen television. The at least two angled armatures 242 may be adapted to tilt the individual flat screen television downward towards the viewers that may be seated around the individual flat screen television.

The individual television mounting site may comprise at least two horizontal mounting armatures 244. The at least two horizontal mounting armatures 244 may lie within a plane that is oriented at the oblique angle 290 such that the rear of the individual flat screen television may contact the at least two horizontal mounting armatures 244. The at least two horizontal mounting armatures 244 may comprise a plurality of television mounting apertures 246. The individual flat screen television may detachably couple to the at least two horizontal mounting armatures 244 via the plurality of television mounting apertures 246.

The bottom cover panel 250 may be a horizontally-oriented panel that covers the bottom of the frame 200. The bottom cover panel 250 may be hingedly coupled to the bottom plate 220 via a continuous hinge 252. The bottom cover panel 250 may pivot downward to a bottom panel open position 292 that provides access to the interior of the frame 200 and may pivot upward to a bottom panel closed position 294 for normal use. As a non-limiting example, the continuous hinge 252 may be a piano hinge. The bottom cover panel 250 may comprise one or more panel closing devices 254 located opposite the continuous hinge 252. The one or more panel closing devices 254 may hold the bottom cover panel 250 in the bottom panel closed position 294. As a non-limiting example, the one or more panel closing devices 254 may be a plurality of screws or bolts.

In some embodiments, the bottom cover panel 250 may comprise the infinity mirror 256. The infinity mirror 256 may be adapted to be visible from below the bottom cover panel 250. The infinity mirror 256 may be a novelty feature that creates an optical illusion of a tunnel of lights stretching upwards through the frame 200 to infinity.

In some embodiments, the invention 100 may comprise the plurality of accent panels 260. The plurality of accent panels 260 may be coverings adapted to couple to each corner of the frame 200 between the plurality of flat screen televisions 900 to hide the frame 200 from the viewers. The plurality of accent panels 260 may couple to the plurality of corner studs 230, the top plate 210, the bottom plate 220, the plurality of television mounting sites 240, or any combination thereof. In a preferred embodiment, the plurality of accent panels 260 may be the shape of inverted isosceles trapezoids with the narrow end at the bottom and the wide end at the top. The plurality of accent panels 260 may be decorated by painting the plurality of accent panels 260 in team colors and/or by applying one or more logos to the plurality of accent panels 260. In some embodiments, the plurality of accent panels 260 may comprise at least one illuminated logo 264.

In some embodiments, the invention 100 may comprise the accent lighting 270. The accent lighting 270 may comprise one or more sources of illumination coupled to the interior of the frame 200. The accent lighting 270 may provide a backlight for the plurality of flat screen televisions 900. The accent lighting 270 may promote team spirit and/or a party atmosphere. In some embodiments, the accent lighting 270 may be a fixed color. In some embodiments, the accent lighting 270 may vary in color over time. As a non-limiting example, the accent lighting 270 may fade from one color to another through a spectrum of colors.

Power may be distributed throughout the invention 100 inside of the frame 200. As a non-limiting example, an outlet strip may plug into an outlet at the ceiling electrical box 916 may be provide a plurality of AC outlets for the plurality of flat screen televisions 900, the infinity mirror 256, the at least one illuminated logo 264 or any combination thereof to plug into. The outlet strip and all power cords may be concealed within the frame 200.

In use, the frame 200 may be coupled to a ceiling 912 of a room by fastening the top plate 210 of the frame 200 to ceiling joists using mounting hardware. A plurality of flat screen televisions 900 may be detachably coupled to the plurality of television mounting sites 240. The plurality of accent panels 260, possibly decorated in team colors and one or more logos 262 may be coupled to the corners of the frame 200. The plurality of flat screen televisions 900, the infinity mirror 256, the accent lighting 270, and any other electrical devices within the frame 200 may be plugged into the plurality of AC outlets and may be powered from the ceiling electrical box 916. As a non-limiting example, the plurality of flat screen televisions 900 may be tuned to one or more sporting events and the accent lighting 270 may be configured to display team colors in order to promote team spirit.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

As used in this disclosure, an "aperture" may be an opening in a surface or object. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "display" may be a surface upon which is presented an image, potentially including, but not limited to, graphic images and text, that is interpretable by an individual viewing the image. When used as a verb, "display" may be defined as presenting such an image.

As used here, "footprint" may refer to a projection of an object onto the surface that supports the object. The projection is usually, but not always, vertically downward.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, a "hinge" may be a device that permits the turning, rotating, or pivoting of a first object relative to a second object.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "infinity mirror" may refer to an arrangement of two parallel mirrors where one of the mirrors is fully reflective and the other mirror is partially reflective (i.e., half-silvered, one-way mirror). A plurality of point light sources may be placed around the periphery of the fully-reflective mirror. When an outside observer looks into the surface of the partially reflective mirror, the lights appear to recede into infinity, creating the appearance of a tunnel of great depth that is lined with lights. An infinity mirror may also be referred to as an infinity light or an infinite mirror.

As used in this disclosure, the word "interior" may be used as a relational term that implies that an object is located or contained within the boundary of a structure or a space.

As used herein, the words "invert", "inverted", or "inversion" may refer to an object that has been turned inside out or upside down or to the act of turning an object inside out or upside down.

As used herein, "jumbotron" may refer to a video display system large-screen television technology (a video wall), a plurality of center-hung video displays, or both.

As used in this disclosure, the term "joists" may refer to a plurality of parallel horizontal beams that are used to support a floor or a ceiling. A single beam selected from the plurality of parallel horizontal beams is referred to in the singular as a joist.

As used in this disclosure, a "logo" may be artwork that is typically associated with an organization, brand, or activity. The logo may be textual, graphical, or both.

As used herein, "mounting hardware" may refer to mechanical devices that are used to attach one object to another, including devices whose only purpose is to improve aesthetics. As non-limiting examples, mounting hardware may comprise screws, nuts, bolts, washers, rivets, crossbars, hooks, collars, nipples, cams, standoffs, knobs, caps, plates, rails, lips, brackets, or any combination thereof.

As used herein, "oblique angle" may refer to any angle that is not a right angle or a multiple of a right angle.

As used in this disclosure, an "outlet" may be a device placed in the electrical wiring system of a building where electrical current can be taken to run electrical devices. In this disclosure, an outlet is a socket adapted to receive a plug. In some embodiments, an outlet may find use in a vehicle or on equipment. As non-limiting examples, outlets may be used on recreational vehicles and on generators.

As used herein, "team colors", "school colors", and "brand colors" may refer to a palette of colors selected by an organization as part of the organization's brand identity. The colors may be used on signage, advertisements, web pages, branded apparel, novelty items, uniforms, or anywhere that it is desired to promote or express support for the organization. The term school colors may be used when referring to the colors of a school, university, or college. Team colors may be used when referring to the colors of a sports team. Brand colors may be used when referring to the colors of a business or other organization.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A ceiling-mounted replica jumbotron comprising: a frame and a bottom cover panel;
wherein the frame is operable to suspend a plurality of flat screen televisions from a ceiling of a room such that each of the plurality of flat screen televisions is oriented at an oblique angle with respect to vertical and the plurality of flat screen televisions face different directions;
wherein the frame is coupled to the ceiling of the room such that the ceiling-mounted replica jumbotron covers a ceiling electrical box;
wherein the frame comprises a top plate, a bottom plate, a plurality of corner studs, and a plurality of television mounting sites;
wherein the frame is coupled to the ceiling and the plurality of flat screen televisions detachably couple to the frame at the plurality of television mounting sites;
wherein the top plate is a horizontally-oriented square arrangement of armatures;
wherein the top plate comprises a plurality of mounting apertures such that the top plate is coupled to ceiling joists using mounting hardware;
wherein the bottom plate is a horizontally-oriented square arrangement of armatures;
wherein the bottom plate is the same size as the top plate;
wherein the bottom plate is suspended directly beneath the top plate by the plurality of corner studs;

wherein there are four corner studs coupling the four corners of the top plate to the four corners of the bottom plate.

2. The ceiling-mounted replica jumbotron according to claim 1
wherein the frame has a square footprint and supports four flat screen televisions of equal size.

3. The ceiling-mounted replica jumbotron according to claim 2
wherein the frame is made of metal studs.

4. The ceiling-mounted replica jumbotron according to claim 2
wherein the plurality of flat screen televisions couple to the plurality of television mounting sites;
wherein the plurality of television mounting sites surround the frame;
wherein an individual television mounting site selected from the plurality of television mounting sites is located on each side of the ceiling-mounted replica jumbotron and projects away from the center of the frame.

5. The ceiling-mounted replica jumbotron according to claim 4
wherein the individual television mounting site comprises at least two angled armatures to define the oblique angle for an individual flat screen television;
wherein the at least two angled armatures are adapted to tilt the individual flat screen television downward towards viewers that are seated around the individual flat screen television.

6. The ceiling-mounted replica jumbotron according to claim 5
wherein the individual television mounting site comprises at least two horizontal mounting armatures;
wherein the at least two horizontal mounting armatures lie within a plane that is oriented at the oblique angle such that the rear of the individual flat screen television contacts the at least two horizontal mounting armatures.

7. The ceiling-mounted replica jumbotron according to claim 6
wherein the at least two horizontal mounting armatures comprise a plurality of television mounting apertures;
wherein the individual flat screen television detachably couples to the at least two horizontal mounting armatures via the plurality of television mounting apertures.

8. The ceiling-mounted replica jumbotron according to claim 7
wherein the bottom cover panel is a horizontally-oriented panel that covers the bottom of the frame;
wherein the bottom cover panel is hingedly coupled to the bottom plate via a continuous hinge;
wherein the bottom cover panel pivots downward to a bottom panel open position that provides access to the interior of the frame and pivots upward to a bottom panel closed position for normal use.

9. The ceiling-mounted replica jumbotron according to claim 8
wherein the bottom cover panel comprises one or more panel closing devices located opposite the continuous hinge;
wherein the one or more panel closing devices hold the bottom cover panel in the bottom panel closed position.

10. The ceiling-mounted replica jumbotron according to claim 9
wherein the one or more panel closing devices are a plurality of screws or bolts.

11. The ceiling-mounted replica jumbotron according to claim 9
wherein the bottom cover panel comprises an infinity mirror;
wherein the infinity mirror is adapted to be visible from below the bottom cover panel;
wherein the infinity mirror is a novelty feature that creates an optical illusion of a tunnel of lights stretching upwards through the frame to infinity.

12. The ceiling-mounted replica jumbotron according to claim 11
wherein the ceiling-mounted replica jumbotron comprises a plurality of accent panels;
wherein the plurality of accent panels are coverings adapted to couple to each corner of the frame between the plurality of flat screen televisions to hide the frame from the viewers.

13. The ceiling-mounted replica jumbotron according to claim 12
wherein the plurality of accent panels couple to the plurality of corner studs, the top plate, the bottom plate, the plurality of television mounting sites, or any combination thereof.

14. The ceiling-mounted replica jumbotron according to claim 13
wherein the plurality of accent panels are the shape of inverted isosceles trapezoids with the narrow end at the bottom and the wide end at the top.

15. The ceiling-mounted replica jumbotron according to claim 13
wherein the plurality of accent panels are decorated by painting the plurality of accent panels in team colors and/or by applying one or more logos to the plurality of accent panels.

16. The ceiling-mounted replica jumbotron according to claim 15
wherein the plurality of accent panels comprise at least one illuminated logo.

17. The ceiling-mounted replica jumbotron according to claim 15
wherein the ceiling-mounted replica jumbotron comprises accent lighting;
wherein the accent lighting comprises one or more sources of illumination coupled to the interior of the frame;
wherein the accent lighting provides a backlight for the plurality of flat screen televisions;
wherein the accent lighting promotes team spirit and/or a party atmosphere.

18. The ceiling-mounted replica jumbotron according to claim 17
wherein the accent lighting varies in color over time.

* * * * *